United States Patent [19]

Bauer et al.

[11] Patent Number: 4,741,071
[45] Date of Patent: May 3, 1988

[54] WIPER BLADE

[75] Inventors: Kurt Bauer, Bietigheim-Bissingen; Helmut Markert, Lochgau; Hans Prohaska, Bietigheim-Bissingen; Eckhardt Schmid, Brackenheim, all of Fed. Rep. of Germany

[73] Assignee: SWF Auto-Electric GmbH, Bietigheim-Bissingen, Fed. Rep. of Germany

[21] Appl. No.: 906,793

[22] Filed: Sep. 12, 1986

[30] Foreign Application Priority Data

Sep. 12, 1985 [DE] Fed. Rep. of Germany ....... 3532536

[51] Int. Cl.$^4$ .............................................. B60S 1/38
[52] U.S. Cl. ................................................ 15/250.42
[58] Field of Search ........................ 15/250.36–250.42

[56] References Cited

U.S. PATENT DOCUMENTS 4,309,790  1/1982  Bauer et al. ...................... 15/250.42

FOREIGN PATENT DOCUMENTS 3139444  4/1983  Fed. Rep. of Germany ... 15/250.42
3309972  9/1984  Fed. Rep. of Germany ... 15/250.42
84/00523  2/1984  PCT Int'l Appl. ............. 15/250.42

*Primary Examiner*—Peter Feldman
*Attorney, Agent, or Firm*—James B. Raden; Robert P. Seitter

[57] ABSTRACT

In a wiper blade for a vehicular windshield wiper system, the main yoke is equipped with a spoiler constructed such that the overall height of the wiper blade is not enlarged and nevertheless the spoiler is prevented from touching the window pane to be cleaned. The spoiler is formed in such a way that the wiping pattern does not deteriorate at low or higher driving speeds.

24 Claims, 2 Drawing Sheets

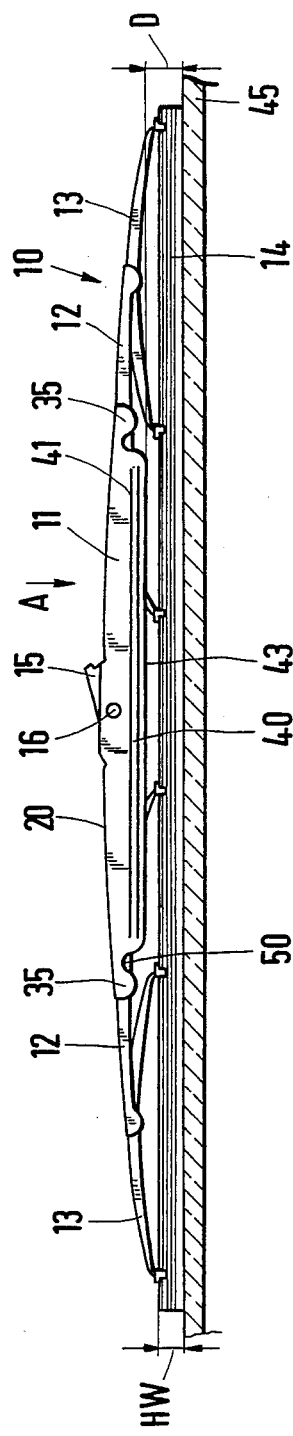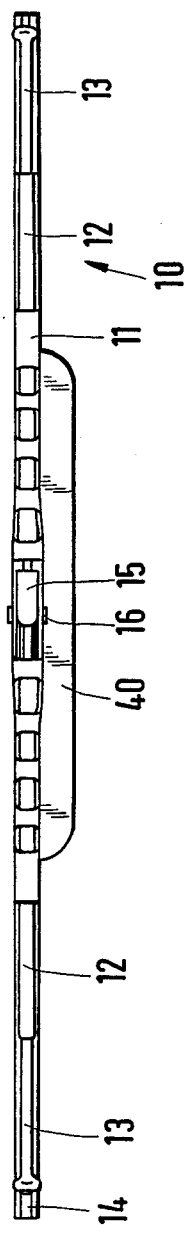

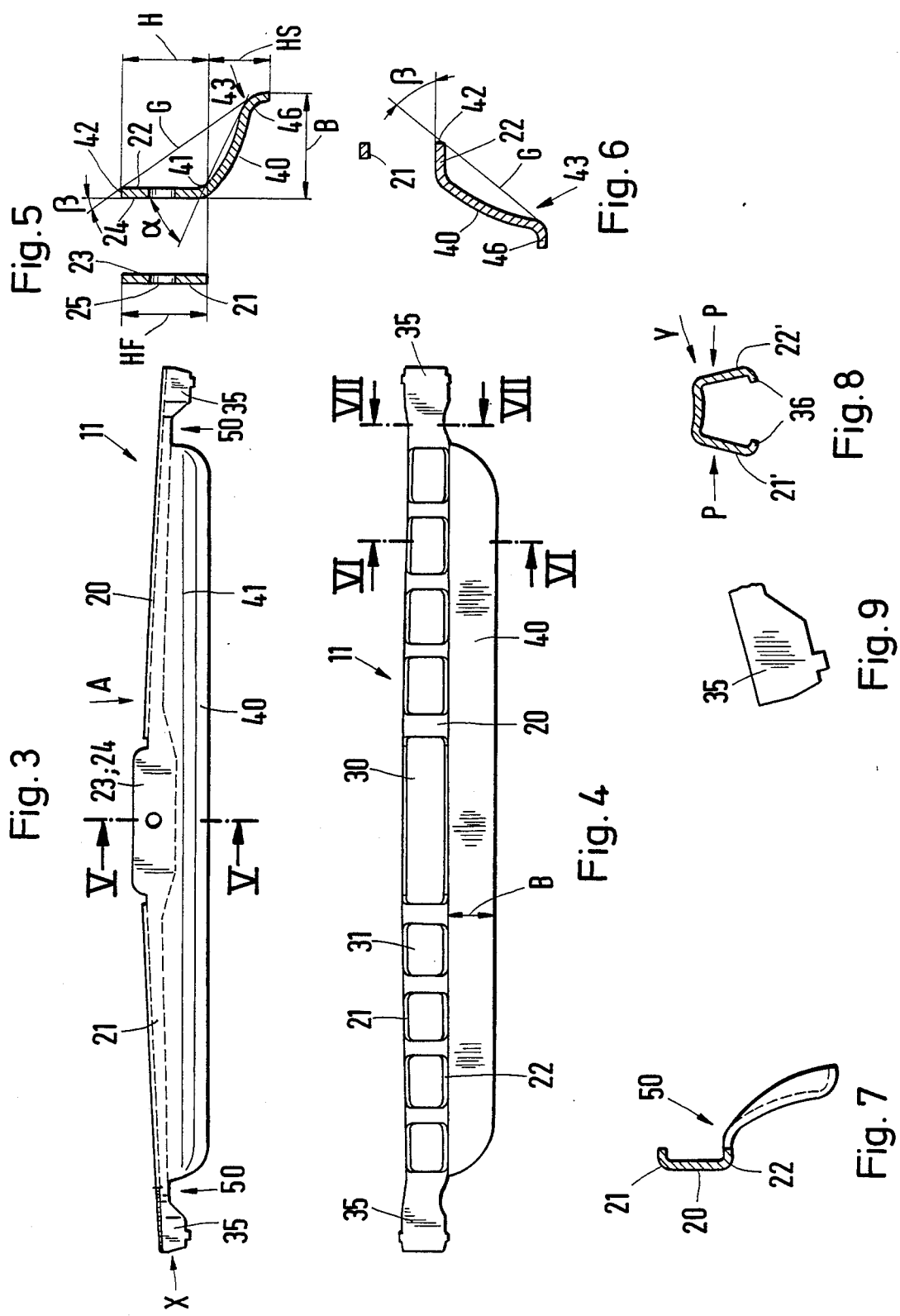

WIPER BLADE

BACKGROUND OF THE INVENTION

The invention pertains to a windshield wiper blade assembly.

It is known that at higher vehicular driving speeds many windshield wipers have a tendency to lift from the window pane being cleaned. The resulting impaired wiping affects traffic safety. Many proposals have already been made to solve this problem. In some arrangements a spoiler having a relatively large surface is fixed onto the wiper arm. However, the overall height of the windshield wiper is thereby enlarged, so that this kind of a construction can not be used when the windshield wiper is to be deposited in a so-called submerged parking position between the windshield and the engine hood. In conventional wiper systems visibility through the windshield is affected by a spoiler with a large surface.

The same disadvantages also appear with a windshield wiper having a wiper blade according to the German Patent No. 1,430,623, the main yoke of which is formed as a spoiler pointing away from the wiper element.

U.S. Pat. No. 3,317,946 shows a wiper blade the main-yoke of which has a roof-shaped cross-section. Although its overall height is not necessarily enlarged this construction does not include a central guidance of the supporting yoke system via the connecting element on a wiper arm. "A central guidance of a supporting yoke system" as used herein means a construction in which the connecting element has large areas guided between two parallel guide surfaces of the main yoke. In the embodiment according to U.S. Pat. No. 3,317,946 the connecting element encompasses guide surfaces at the outside of the supporting yoke. In this example the overall height of the wiper blade is thus increased by the design of the wiper arm-and-blade connection.

German specification OS No. 2,346,100 shows a wiper blade in which a spoiler is attached on each of the clawed yokes of the supporting yoke system. The overall height of a wiper blade of this kind corresponds to conventional wipers. However positioning of the spoilers on the clawed yokes does not optimally cure the tendency of the wiper blade to lift from the window pane because the contact pressure is not increased in the central area of the wiper element. Moreover in a construction of this kind the spoilers will touch the window pane, if the window is considerably curved and the wiper element bends correspondingly.

In the wiper blade of German specification OS No. 3,139,444 the main yoke has a substantially U-shaped cross-section with a web for the connection of two side walls projecting therefrom approximately perpendicularly. The side walls form parallel guide surfaces for a connecting element to a wiper arm guided between them. Thus this wiper blade has predominantly central guidance for the wiper arm. A spoiler is held on one side wall of the main yoke via narrow webs. The spoiler screens the central area of the wiper element. Thus the spoiler is not directly adjacent to the side wall of the supporting yoke and therefor has a relatively small effective surface. There is also a risk of the spoiler touching the window pane when the wiper blade is used for cleaning considerably curved lateral window panes.

SUMMARY OF THE INVENTION

The present invention is based on the problem of developing a wiper blade with central guidance of the connecting element between guide surfaces of the supporting yoke system in such a way that its tendency to lift from the window pane is effectively diminished without increasing its overall height. Moreover the wiper blade is to be produced at favorable costs and is to be capable of being universally used and, also, is to meet all requirements with regard to safety.

In accordance with the invention, a main yoke having a U-shaped cross section has an integral spoiler extending from the rim of one of its side walls adjacent to the wiper element. The width and height of the side wall are selected such that the effective angle for the air stream between an imaginary line connecting the upper edge of the side wall and the free rim of the spoiler lies between 30 degrees to 60 degrees.

The basic idea of the present invention thereby substantially depends on the knowledge that wiping behavior at high driving speeds is influenced not only by the angle of inclination of the spoiler relative to the window pane to be cleaned or - differently formulated - relative to the side wall of the supporting yoke, but also depends on the effective angle of the air stream has with the side wall of the main yoke adjoining the spoiler. Comprehensive tests indicate that this effective angle for the air stream should lie between 30° and 60°.

Because of these findings the real angle of inclination of the spoiler can be varied within a certain tolerance range without affecting the tendency of the wiper blade to lift from the windshield. This opens up a possibility of arranging the spoiler relatively flat to the window pane in such a way that the clear height of the said spoiler is smaller than the height of the wiper element. In this manner contact between spoiler and window pane is reliably prevented. As far as an extremely curved windshield is concerned the wiper element can in the critical center area indeed only be curved as far as the back abuts the connecting element or the wiper arm end.

A wiper blade in accordance with the invention is centrally guided in the manner of prior constructions, has an overall height no larger than that of prior constructions, but has improved wiping behavior even at higher driving speeds, and assures that there is no risk of the spoiler contacting the window pane to be cleaned.

In one embodiment of the invention a wiper blade is arranged in such a way that the spoiler does not normally screen the wiper element. This means that between the said spoiler and the back of the wiper element there remains a gap for an air stream which is to flow off unimpeded. The main yoke thereof is provided with wide air slots in the manner described in detail in German Patent No. 2,843,249.

The aerodynamic behavior of the wiper blade is furthermore substantially improved because a smaller working surface is exposed to the air streaming through the gap due to the small height of the other side wall of the supporting yoke. Further in accordance with one aspect of the invention the free rim of the spoiler is covered by a strip with rounded surfaces or includes an integrally formed rounded collar. With this arrangement the risk of injuries is reduced.

BRIEF DESCRIPTION OF THE DRAWING

The invention will be better understood from a reading of the following detailed description in conjunction with the drawing in which:

FIG. 1 is a lateral view of a wiper blade;

FIG. 2 is a view onto the wiper blade of FIG. 1 in the direction of arrow A;

FIG. 3 is a lateral view of the main yoke on an enlarged scale;

FIG. 4 is a view onto the main yoke of FIG. 3 in the direction of arrow A;

FIG. 5 is a section through the main yoke taken on the line V—V of FIG. 3 in the area of the moving joint for the wiper arm;

FIG. 6 is a section taken on the line VI—VI of FIG. 4;

FIG. 7 is a section taken on the line VII—VII of FIG. 4;

FIG. 8 is a view on the joint area in the direction of arrow X; and

FIG. 9 is a view in the direction of arrow Y of FIG. 8.

DETAILED DESCRIPTION

The wiper blade has a supporting yoke system with a longitudinally straight main yoke 11, two intermediate yokes 12 and two clawed yokes 13. This supporting yoke system 10 serves to guide a wiper element 14 constructed in a known manner. The main yoke 11 corresponds in many details to conventional constructions. It has a substantially U-shaped cross-section with a web 20, from which project two side walls 21 and 22 approximately perpendicularly. In the center area of the main yoke 11 side walls 21 and 22 form guide surfaces 23 and 24 for a connecting element 15 indicated in FIG. 1 to a wiper arm which is not shown in detail. The connecting element 15 can be a known two-legged plastic locking spring, which is swivellably mounted on a pivot pin 16 riveted in bores 25 of side walls 21, 22. Web 20 includes an aperture 30 in the area of the guide surfaces, through which the connecting element 15 protrudes from the top of the main yoke back as FIG. 1 shows. Moreover several slots 31 are provided in web 20. The width of slots 31 corresponds to the width of the web 20, so that slots 31 extends as far as side walls 21, 22. As most clearly seen in FIG. 3 web 20 is slightly curved. At both end areas main yoke 11 has a joint area 35, for articulating the intermediate yokes in conventional fashion. As FIGS. 8 and 9 show, inwardly directed tongues 36 are formed onto side walls 21', 22' in this joint area. Tongues 36 after mounting of the wiper blade, engage in pockets of a link (not shown in detail) and thus encompass the intermediate yoke in the manner of a joint. The joint has been described in detail in German patent No. 2,758,914. During assembly the side walls 21', 22' have to be pressed towards each other in the direction of arrow P.

The wiper blade according to the present invention differs from known wiper blades in the following points: A spoiler 40 is directly integrally formed onto the lower rim of the side wall 22. This spoiler extends under a particular angle of inclination α towards the side wall 22 to the wiper element. The result is a bending line 41 at the lower rim of the side wall 22 which is substantially straight. In FIGS. 5 and 6 a straight imaginary line G is drawn. Line G touches the upper edge 42 and free rim 43. Imaginary straight line G marks the effective angle for the air stream. The height H of the side wall 2 and the width B of the spoiler 40 are adapted to each other in such a way that the angle β between the said straight line G and the side wall 22 lies between 30° and 60°. Experiments have shown that then the wiping pattern does not deteriorate even at high driving speeds. In an optimal solution the said angle β measured in the center area of the main yoke 11 amounts to 35°. Because web 20 of the main yoke is slightly curved, but the bending line 41 is at least substantially straight, the height of the side wall 22 diminishes slightly from the center area towards the ends. This means of course that the angle β between the straight line G and the side wall 22 becomes larger towards the supporting yoke ends. In the main yoke center the values of this angle β lie between 30° and 40° but between 40° and 60° at the ends in a preferred embodiment.

Thus angle β determines the wiping behavior and the shape of the spoiler itself can be varied within certain limits. One can see from the cross-sections of FIGS. 5 and 6 that the spoiler is slightly bulged towards the wiper element. The real angle α is much larger than 45° so that the clear height HS of the spoiler 40 projected in the wiping direction is relatively small. Contact of the spoiler 40 with the window pane is reliably prevented, when the said height HS of the spoiler 40 is smaller than the height HW of the wiper element 14 shown in FIG. 1. Thus there remains a gap between the back of the wiper element and the spoiler through which an air stream can pass, which because of the slots 31 in the main yoke 11 is opposed by only a relatively small resistance.

FIGS. 3 and 5 show clearly that the height H of the side wall 22 with the spoiler 40 depends on the necessary height HF of the guide surfaces 22, 24.

Thus in the area of the guide surfaces the side walls 21 and 22 have the same height HF as FIG. 5 shows. Because of the curved web 20 the height of side walls 22 diminishes slightly towards the ends. In contrast thereto the height of the other side wall 21 is substantially smaller outside the portion forming the guide surface 23 as FIG. 6 and the broken line of the lower rim of the side wall in FIG. 3 show. This measure also contributes to the fact that the air stream can flow unimpeded through the gap between wiper element and spoiler 40 and therefore cannot produce forces opposed to the contact force.

As can be seen in the various figures the spoiler has a substantially trapezoid, however slightly rounded contour. By this measure the risk of injuries is avoided. For the same reason spoiler 40 has a slightly rounded collar 46 pointing towards the wiper element 14.

It is also important that the entire length of the spoiler adjoins the rim of the side wall adjacent to the wiper element. The slots 31 are arranged in an area of the main yoke 11 which corresponds to the extent of the spoiler in the longitudinal direction of the main yoke 11. With this arrangement a spoiler 40 with a surface as large as possible is created and the air stream flowing below can optimally pass through the long and wide slots.

FIGS. 1 and 3 clearly show that the spoiler 40 ends a short distance in front of the joint area 35 between the main yoke and the intermediate yoke. In this area an indent 50 is worked into the side wall 22 with the spoiler 40, so that the height of the side wall is substantially smaller than in the areas adjacent thereto. Thus in the area of indent 50 there is in effect formed a predetermined bending line, so that the side walls 21', 22' can be pressed more simple towards each other in the joint area and springing back of these side wall portions is effectively prevented. As seen in FIG. 7 the two side walls 21, 22 have the same height in the area of indent 50.

The guide surfaces 23, 24 on the main yoke 11 in the longitudinal direction of the latter are symmetrical to the centrally arranged connecting pin 16. The wiper blade can then be universally used.

The main yoke is preferably punched out of a sheet metal blank in a manner known in itself and deformed, especially bent, according to the requirements. However essential elements of the present invention are also applicable in supporting yoke systems of plastics parts.

What is claimed is:

1. A wiper blade assembly including a supporting yoke system for guiding a wiper element, said assembly comprising:
   a connecting element to a wiper arm;
   a main yoke articulated to said connecting element;
   intermediate yokes articulated onto the ends of said main yoke;
   said main yoke having a substantially U-shaped cross-section with a web connecting a pair of side walls forming parallel guide surfaces for said connecting element;
   a spoiler extending from the edge adjacent to said wiper element of one side wall of said side walls at a predetermined angle of inclination and said spoiler having a free rim;
   the width of said spoiler, the height of said one side wall and said angle of inclination being selected such that the effective angle of the air stream from an imaginary line connecting an upper edge of said one side wall with said free rim of said spoiler lies in the range between 30 degrees and 60 degrees.

2. A wiper blade assembly in accordance with claim 1, wherein:
   the height of said spoiler projected in the wiping direction is smaller than the height of said wiper element.

3. A wiper blade assembly in accordance with claim 1, wherein:
   the cross-section towards the wiper element of said spoiler is slightly bulged.

4. A wiper blade assembly in accordance with claim 1, wherein:
   said spoiler has a substantially trapezoid contour, which is slightly rounded in the corner regions.

5. A wiper blade assembly in accordance with claim 1, wherein:
   said spoiler over its entire length, is directly adjacent to the rim of said one side wall adjoining said wiper element.

6. A wiper blade assembly in accordance with claim 1, wherein:
   the spacing between the free rim of said spoiler and a supporting plane for said wiper element is larger than the height of said wiper element.

7. A wiper blade assembly in accordance with claim 1, wherein:
   said web includes slots which extend as far as to at least one of said side walls.

8. A wiper blade assembly in accordance with claim 7, wherein:
   said slots are arranged in a region of said main yoke which corresponds to the extent of the spoiler in the longitudinal direction of said main yoke.

9. A wiper blade assembly in accordance with claim 1, wherein:
   said web is slightly curved, but the bending line between said spoiler and the lower rim of said side wall is at least substantially straight, so that the height of the said side wall diminishes slightly from its center area to its end areas.

10. A wiper blade assembly in accordance with claim 9, wherein:
    said angle is between 30° and 40° in said center area, but between 40° and 60° at its said end areas.

11. A wiper blade assembly in accordance with claim 1, comprising:
    a pin for coupling said connecting element to said main yoke;
    said guide surfaces in the longitudinal direction being symmetrical to said pin.

12. A wiper arm assembly in accordance with claim 1, wherein:
    said main yoke and said spoiler is formed from a sheet metal blank as a single piece.

13. A wiper blade assembly including a supporting yoke system for guiding a wiper element, said assembly comprising:
    a connecting element to a wiper arm;
    a main yoke articulated to said connecting element;
    intermediate yokes articulated onto the ends of said main yoke;
    said main yoke having a substantially U-shaped cross-section with a web connecting a pair of side walls, said side walls forming parallel guide surfaces for said connecting element;
    a spoiler extending from the edge adjacent to said wiper element of one side wall of said side walls at a predetermined angle of inclination and said spoiler having a free rim;
    the width of said spoiler, the height of said one side wall and said angle of inclination being selected such that the effective angle of the air stream from an imaginary line connecting an upper edge of said one side wall with said free rim of said spoiler lies in the range between 30 degrees and 60 degrees;
    the height of said one side wall depends on the necessary height of the guide surface of said one wall; and
    the height of the other side wall having portions outside the portion forming one of said guide surfaces which are smaller in height than said one side wall.

14. A wiper blade assembly in accordance with claim 13, wherein:
    said web is slightly curved, but the bending line between said spoiler and the lower rim of said one side wall is at least substantially straight, so that the height of the said side wall diminishes slightly from its center area to its end areas.

15. A wiper blade assembly in accordance with claim 14, wherein:
    said angle is between 30° and 40° in said center area, but between 40° and 60° at its said end areas.

16. A wiper blade assembly including a supporting yoke system for guiding a wiper element, said assembly comprising:
    a connecting element to a wiper arm;
    a main yoke articulated to said connecting element;
    intermediate yokes articulated onto the ends of said main yoke;

said main yoke having a substantially U-shaped cross-section with a web connecting a pair of side walls, said side walls forming parallel guide surfaces for said connecting element;

a spoiler extending from the edge adjacent to said wiper element of one side wall of said side walls at a predetermined angle of inclination and said spoiler having a free rim;

the width of said spoiler, the height of said one side wall and said angle in inclination being selected such that the effective angle of the air stream from an imaginary line connecting an upper edge of said one side wall with said free rim of said spoiler lies in the range between 30 degrees and 60 degrees.

17. A wiper blade assembly in accordance with claim 16, wherein:

said collar is bent towards said wiper element.

18. A wiper blade assembly in accordance with claim 16, wherein:

said rounded collar is integrally formed with said rim.

19. A wiper blade assembly in accordance with claim 16, comprising:

a pin for coupling said connecting element to said main yoke;

said guide surfaces in the longitudinal direction being symmetrical to said pin.

20. A wiper arm assembly in accordance with claim 16, wherein:

said main yoke and said spoiler is formed from a sheet metal blank as a single piece.

21. A wiper blade assembly including a supporting yoke system for guiding a wiper element, said assembly comprising:

a connecting element to a wiper arm;

a main yoke articulated to said connecting element;

intermediate yokes articulated onto the ends of said main yoke;

said main yoke having a substantially U-shaped cross-section with a web connecting a pair of side walls, said side walls forming parallel guide surfaces for said connecting element;

a spoiler extending from the edge adjacent to said wiper element of one side wall of said side walls at a predetermined angle of inclination and said spoiler having a free rim;

the width of said spoiler, the height of said one side wall and said angle of inclination being selected such that the effective angle of the air stream from an imaginary line connecting an upper edge of said one side wall with said free rim of said spoiler lies in the range between 30 degrees and 60 degrees;

said main yoke having joint areas where said main yoke is coupled to said intermediate yokes;

said spoiler ending a predetermined distance away from each of said joint areas, said main yoke having an indent at each end between said spoiler and said joint areas, said indent being of smaller height than the yoke portions adjacent thereto.

22. A wiper blade assembly in accordance with claim 17, wherein:

said pair of side walls are both of same height in the portion in front of said joint areas.

23. A wiper blade assembly in accordance with claim 21, comprising:

a pin for coupling said connecting element to said main yoke;

said guide surfaces in the longitudinal direction being symmetrical to said pin.

24. A wiper arm assembly in accordance with claim 21, wherein:

said main yoke and said spoiler is formed from a sheet metal blank as a single piece.

* * * * *